L. W. NELSON.
DYNAMO ELECTRIC MACHINE.
APPLICATION FILED AUG. 14, 1914.

1,276,682.

Patented Aug. 20, 1918.
3 SHEETS—SHEET 1.

Witnesses
Robert H. Weir
R. H. Van Nest

Inventor
Lewis W. Nelson
By: Edwin B. H. Tower Jr.
Atty.

L. W. NELSON.
DYNAMO ELECTRIC MACHINE.
APPLICATION FILED AUG. 14, 1914.
1,276,682.
Patented Aug. 20, 1918.
3 SHEETS—SHEET 2.
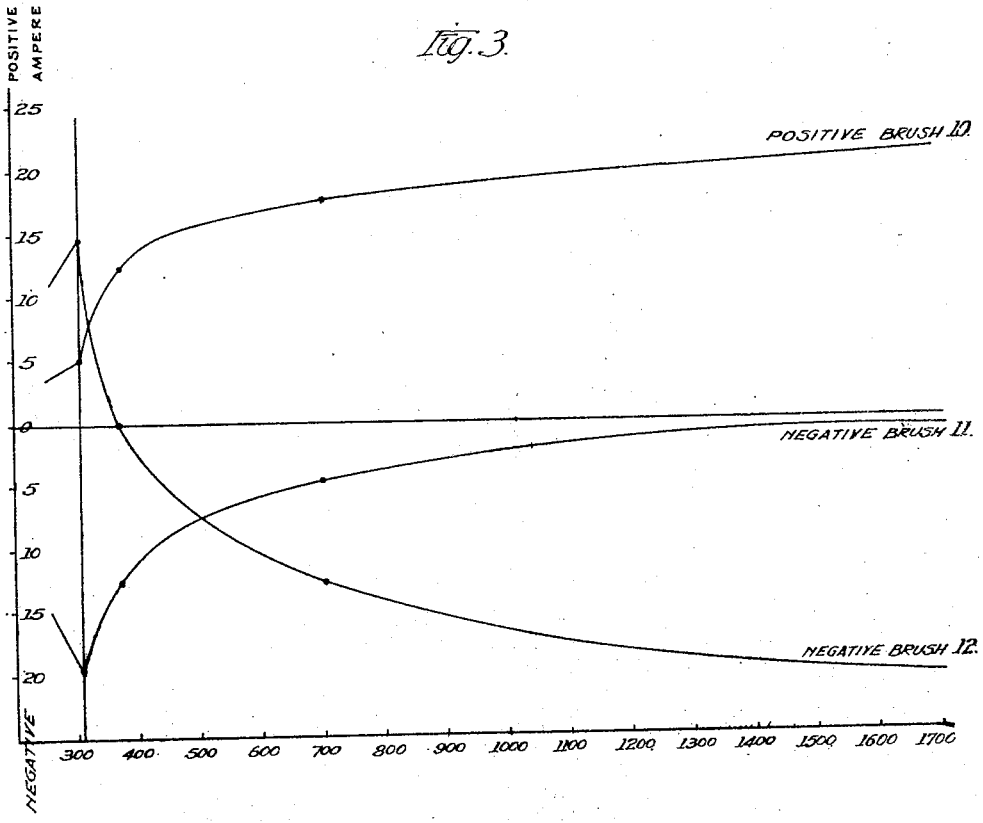
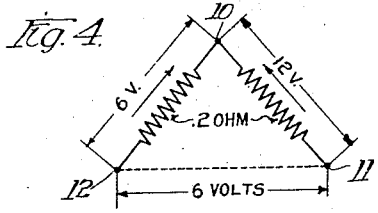
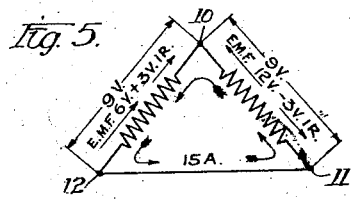
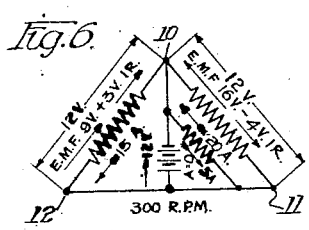
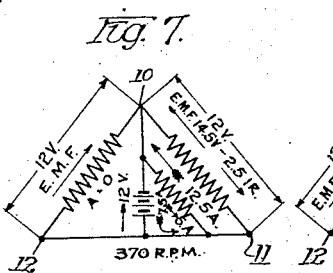
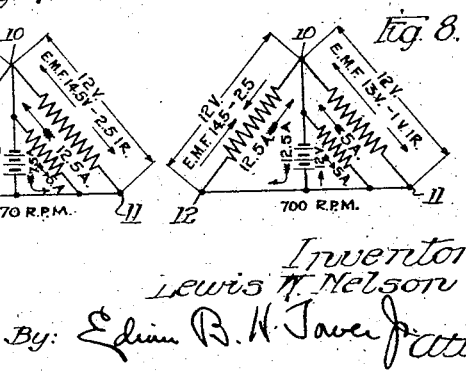
Witnesses:
Robert H. Weir
R. H. Van Nest
Inventor
Lewis W. Nelson
By: Edwin B. H. Tower Jr. Atty.

L. W. NELSON.
DYNAMO ELECTRIC MACHINE.
APPLICATION FILED AUG. 14, 1914.
1,276,682.
Patented Aug. 20, 1918.
3 SHEETS—SHEET 3.
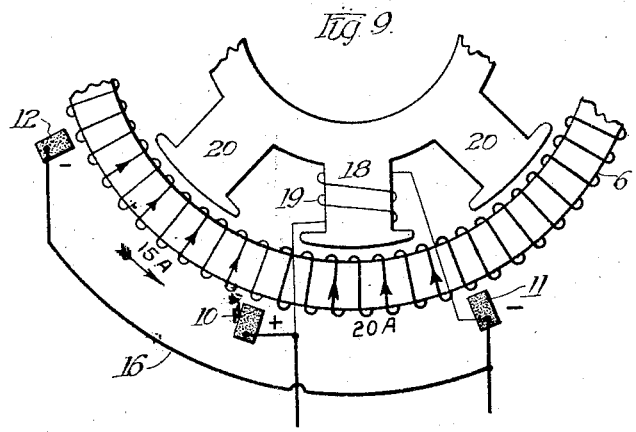
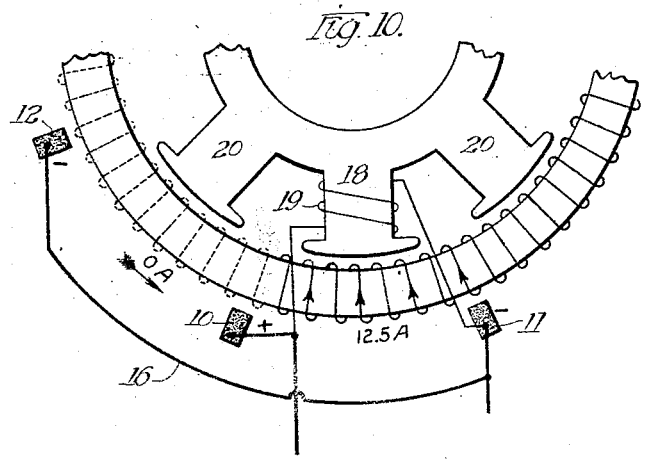
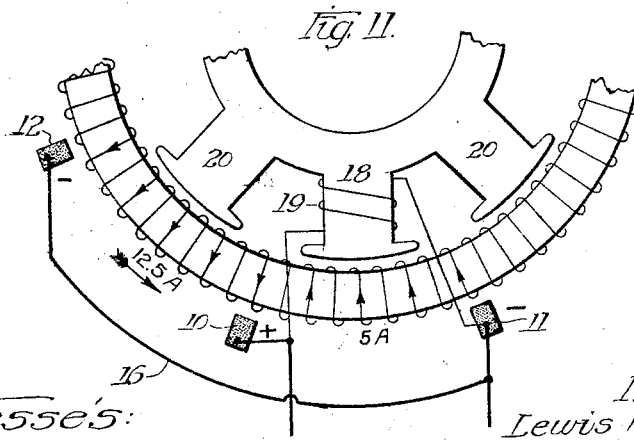
Witnesses:
Robert F. Weir
R. H. Van Nest
Inventor
Lewis W. Nelson
By: Edwin B. H. Tower Jr.
Atty.

UNITED STATES PATENT OFFICE.

LEWIS W. NELSON, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

DYNAMO-ELECTRIC MACHINE.

1,276,682.          Specification of Letters Patent.          Patented Aug. 20, 1918.

Application filed August 14, 1914. Serial No. 856,805.

*To all whom it may concern:*

Be it known that I, LEWIS W. NELSON, a citizen of the United States, residing at Niagara Falls, in the county of Niagara and State of New York, have invented new and useful Improvements in Dynamo-Electric Machines, of which the following is a full, clear, concise, and exact description, reference being had to the accompanying drawing, forming a part of this specification.

This invention relates to dynamo-electric machines. It is particularly applicable to a dynamo-electric machine which is adapted to be employed in an automobile starting and lighting system, and which serves as a motor to start the engine and then as a generator to furnish current to charge a storage battery and light lamps.

The invention will be explained by reference to a dynamo electric machine which has its armature directly connected to the engine shaft to serve as a fly-wheel, but it will be understood that it may be embodied in various other dynamo-electric machines.

For convenience, the dynamo-electric machine will hereafter be designated either a motor or a generator according to the functions it performs under the conditions that obtain at the time.

A storage battery furnishes the current to run the motor. It also furnishes current to operate the lamps when the generator is inactive. To start the engine a starting switch is closed to supply current from the battery to the motor. Then the starting switch is opened and the motor becomes a generator, it being driven by the engine, and when it attains sufficient speed to develop a predetermined voltage an automatic switch closes through which current is supplied to charge the battery and light the lamps.

It is required that provision be made to keep the output of the generator within certain limits, as otherwise the battery would be subject to an abnormal current, and to this end an automatic regulator has been employed to regulate the current in the generator field.

An object of the present invention is to provide a generator which will inherently produce the proper current for the battery.

Another object is to provide a dynamo-electric machine which as a motor will develop a high torque, and which as a generator will inherently produce the proper current for the battery.

In accordance with this invention, the dynamo-electric machine as a generator has a field winding and an armature winding. The field winding produces the field flux. The armature winding produces a magneto-motive force which, according to varying electrical conditions, assists or opposes the magneto-motive force set up by the field winding. The effect of this magneto-motive force in the armature is to so control the resultant field strength as to maintain the voltage across the generating brushes of the machine at such a value that a proper current for the battery is maintained, notwithstanding the variations in speed at which the armature is rotated.

To this end means are provided whereby the armature turns are given a value sufficient to vary the resultant field flux to keep the current within the proper limits, and so far in the practice of this invention, the armature magneto-motive force has been made great enough to vary the field flux inversely to the variations in speed.

When the dynamo-electric machine is to be used as a starter, it is designed to produce a high torque as a motor and provision is made, as above explained, to keep the current within the proper limits when it operates as a generator. Other points about this invention will hereinafter be brought out.

A dynamo-electric machine, embodying this invention, will now be explained in detail.

The views in the drawings are as follows:

Fig. 3 is a chart of the distribution of current at the brushes of the generator.

Figs. 4 to 8 illustrate diagrammatically the current direction and value in the sections of the armature at various speeds.

Figs. 9, 10 and 11 illustrate pictorially the current values in the sections of the armature at various speeds.

Figure 1:
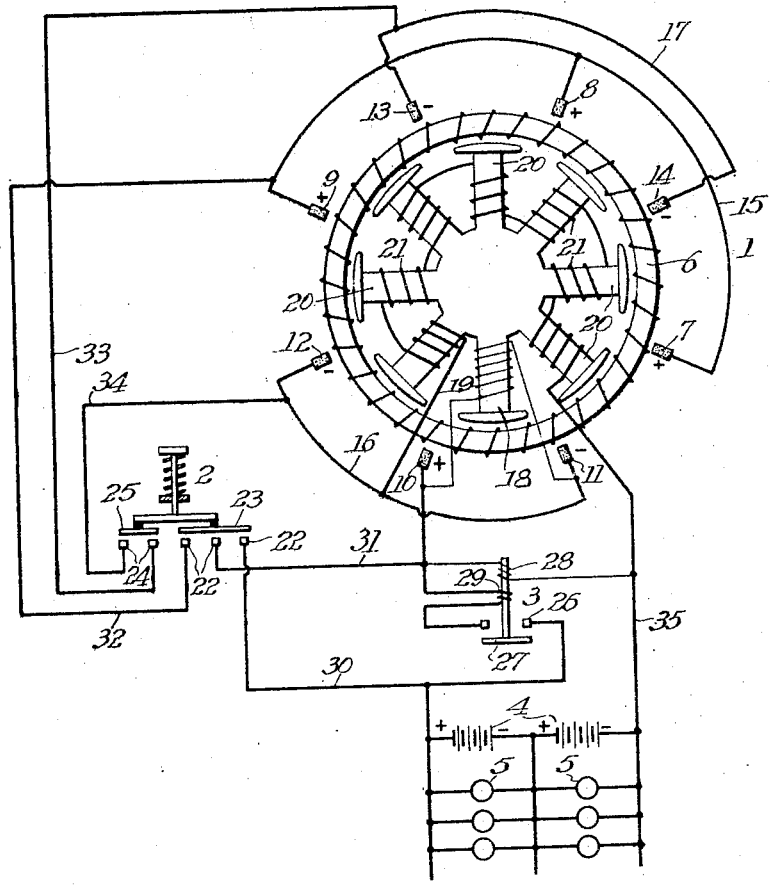
Figure 1 is a diagram of the automobile starting and lighting system.

The starting and lighting system has a dynamo-electric machine 1, a starting switch 2, an automatic switch 3, a storage battery 4, and lamps or other translating devices 5.

The dynamo-electric machine has a Gramme ring armature 6, which is carried on the engine shaft to serve as the fly-wheel. Four positive brushes, 7, 8, 9 and 10, and four negative brushes, 11, 12, 13, 14, are employed. The three positive brushes, 7, 8, 9, are electrically connected together by a bus ring or conductor 15. The remaining positive brush 10 is not connected to the conductor 15. The negative brushes 11, 12, are connected together by bus ring or conductor 16, while the two remaining negative brushes 13, 14, are also connected together by a bus ring or conductor 17.

The field has eight poles, one pole 18 being provided with a shunt winding 19, while the remaining seven poles 20 have series windings 21. The armature is arranged outside the field and rotates around the same.

The starting switch has three contacts 22 adapted to be connected together by a bridging contact 23 and two additional contacts 24 adapted to be connected together by a bridging contact 25. The contacts 22 are connected respectively to the bus ring or conductor 15, the brush 10 and the positive battery terminal, while the contacts 24 are connected respectively to the conductors 16 and 17.

The automatic switch 3 is arranged between the generator and battery. It has a pair of contacts 26 and a bridging contact 27. The bridging contact is operated electromagnetically by a lifting coil 28, connected across the generator terminals and a holding coil 29, connected in series between the generator and battery when the switch closes. The lifting coil closes the switch when the generator voltage substantially equals the battery voltage and the holding coil assists to keep the switch closed. When the voltage of the generator falls below the battery voltage, the battery discharges through the holding coil. This causes the holding coil polarity to reverse so that it opposes the lifting coil and causes the switch to open.

When the engine is at rest, the automatic switch and starting switch are open, as illustrated.

When the starting switch is closed, the contacts 22 are connected together as are also the contacts 24. Current then flows from the battery through conductor 30 to the switch contact 22 and bridging contact 23, where it divides, a portion flowing by conductor 31 to the positive brush 10, and the remainder flowing by conductor 32 to the bus conductor 15 and the positive brushes 7, 8, 9. This current flows through the armature to the negative brushes. That portion returning through the brushes 13, 14, flows through conductors 17, 33, starting switch contacts 24, 25, and the conductor 34 to conductor 16, where it joins current from the brushes 11 and 12 and passes through the series field windings 21 and conductor 35, back to the battery. The shunt field winding 19 is also energized by current flowing from brush 10 to brush 11.

The current from the battery thus energizes the shunt and series field windings which produce a strong field, and the armature winding is subjected to the full battery voltage. Consequently, a motor of high torque is provided for starting the engine.

When the engine has started, the starting switch is opened and the positive brushes 7, 8, 9, are disconnected from positive brush 10 and negative brushes 13, 14, are disconnected from negative brushes 11, 12. The single positive brush 10 and the adjacent negative brushes 11, 12, supply current to the shunt field winding 19.

Before the automatic switch closes, the only current supplied by the generator is the small amount necessary to energize the shunt field. Thus the generator starts practically without load and its voltage rapidly builds up until, at a predetermined voltage, the automatic switch connects it to the battery and lamps.

The generator so operates under varying speed conditions that it inherently maintains a proper current for the battery throughout the imposed variations in speed.

The principle upon which the generator operates to obtain this result will be explained by reference to the circuit diagrams and pictorial representations in Figs. 3 to 11. These figures represent actual conditions in a generator having a Gramme-wound armature similar to that illustrated in Fig. 1.

Figure 2:
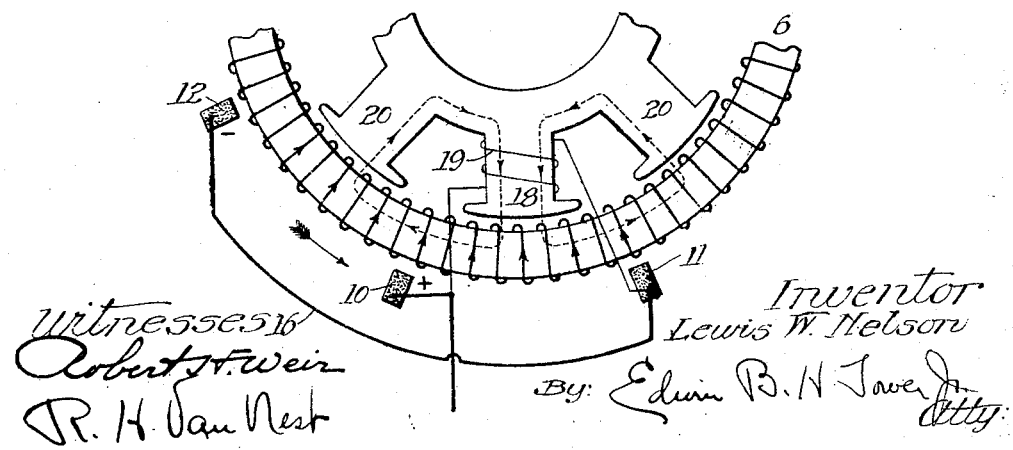
Fig. 2 is a simplified diagram of the active generator portion of the machine shown in Fig. 1.

It will be sufficient to consider only the portions of the machine illustrated in Fig. 2 in explaining the theory upon which the generator operates, inasmuch as only the portion of the armature and field therein illustrated, and only brushes 10, 11 and 12 are utilized in generating.

It may be assumed that the active generator section of the machine has eight armature coils between each pair of brushes, each coil having twenty-one turns. Consequently, there are one hundred and sixty-eight active turns between the brushes. The shunt field is provided with sufficient turns to give approximately twelve hundred (1200) ampere turns at twelve (12) volts. This machine generates approximately twelve (12) volts at three hundred (300) revolutions per minute of the armature. If, therefore, a 6-cell, 12-volt battery be employed, the automatic switch will connect the generator and battery at approximately three hundred (300) R. P. M. When the speed rises above three hundred (300) R. P. M., the active field flux decreases. As a result, proper battery charging current is maintained over a wide speed range. This result is obtained through the demagnetizing force which the magnetomotive force of the armature exerts on the field.

The results obtained may be varied by varying the ratio between the armature turns and the field turns so that a current of proper characteristics to suit the battery may be obtained.

Fig. 3 shows the value and direction of current passing through the three generator brushes throughout an armature speed range from 300 to 1700 R. P. M. The ordinates represent amperes, those above the zero line indicating positive current values and those below the line indicating negative values. The abscissæ represent revolutions per minute. The abscissa at 300 represents the speed at which the automatic switch closes.

The diagrams, Figs. 4 and 5, illustrate the circuit conditions existing before the automatic switch closes and the diagrams, Figs. 6, 7 and 8, and the pictorial representations, Figs. 9, 10 and 11, represent the circuit conditions at armature speeds respectively of 300, 370 and 700 R. P. M. In these diagrams the plain arrows indicate the direction of electro-motive force and the feathered arrows indicate the direction of current. The three points of the triangles designated 10, 11 and 12 represent the three brushes similarly designated on Figs. 1 and 2.

These diagrams show that the currents circulating in the armature winding between brushes 11 and 12, directly control the value of the current output delivered to the external circuit through positive brush 10. Reference will be made to the well-known Kirchoff laws, that at any point in a circuit the sum of the currents flowing to that point is equal to the sum of the currents flowing away from it, and that in any closed circuit or network, the algebraic sum of the product of current and resistance is equal to the sum of the electro-motive forces. Therefore, it follows that the algebraic sum of the electro-motive forces in a closed circuit equals zero. Also it is understood that the electro-motive forces developed by a current flowing through a resistance is a counter-electro-motive force which opposes the electro-motive force which causes the current flow.

Referring now to Fig. 4, it may be assumed that the north pole 18, carrying the magnetizing winding 19, is excited from a separate source and that the external circuits leading from the brushes 10, 11, 12 are open. The flux emanating from the north pole 18 will divide in the armature core part, returning through the south pole on the left hand, and an equal amount returning through the south pole on the right since the reluctance over all the poles is uniform. These south poles are therefore consequent poles. When the armature is rotated, electro-motive forces will be developed in the armature. The electro-motive force developed in the armature winding between brushes 10 and 11 will be double the electro-motive force developed in the winding between brushes 10 and 12, since twice the amount of flux flows from pole 18 as returns through either one of the adjacent poles 20. At a certain definite speed, therefore, the condition illustrated by Fig. 4 will exist. It is assumed in this figure that the brushes 11 and 12 are not connected. If the speed be such that 12 volts are induced in the winding which terminates in brushes 10 and 11, then 6 volts will be developed in the windings terminating in brushes 10 and 12 and these electro-motive forces being in opposition will give a resultant electro-motive force of 6 volts across brushes 11 and 12. If now the brushes 11 and 12 be connected by the conductor 16, which is a continuous conductor having a negligible resistance, current will flow around the circuit thus completed, as indicated in Fig. 5. It is assumed that the armature windings between each pair of brushes have a resistance of two-tenths ($\frac{2}{10}$) ohms so that, neglecting the effects of the armature current on the flux, the 6 volts available would cause a current of 15 amperes to circulate in the armature windings, since these windings together have a resistance of four-tenths ($\frac{4}{10}$) ohms. This current of 15 amperes will develop a voltage drop of 6 volts or 3 volts in either half of the armature winding. The right hand half of the armature winding terminating in brushes 10 and 11, is the predominating source of electro-motive force, and therefore the voltage due to the resistance drop in this section, will be in opposition to the induced voltage, while in the left hand winding, the voltage due to the resistance drop will be added to the induced voltage. Therefore, the voltage across brushes 10 and 11 or 10 and 12 will, under these conditions, be 9 volts. The current flows from brush 11 through the armature winding and leaves by brush 12, which is connected with brush 11 by the conductor 16 having practically zero resistance, and this current therefore exerts a magnetizing effect, tending to direct the flux to the left, that is, the current through the armature winding exerts a magnetizing force in a direction tending to cause the magnetic flux to flow through the north pole 18 and the left hand south pole, and tends to divert flux from the right hand south pole. The relative turns in this machine are such that the ampere turns, due to the current flowing through the armature winding, greatly exceed in value the ampere turns initially produced by the shunt winding 19 around the pole 18.

Since the brushes 11 and 12 are directly connected, the effective voltage developed across the brushes will be a function of the magnetic flux which is produced by the joint action of the shunt winding on the pole 18 and the current traversing the armature winding in the direction flowing from brush 11 to brush 12. It follows from Kirchoff laws that the electro-motive force effective across the brushes 10 and 12 at any instant, must exactly equal the opposing electro-motive force across brushes 10 and 11. The electro-motive force across either pair of brushes is necessarily the algebraic sum of the induced electro-motive force and the electro-motive force due to the resistance drop. At any instant, therefore, the current circulating in these windings will have a value sufficient to develop a voltage drop which, when added to or subtracted from the voltage induced in either winding, will bring about the necessary equalization of voltages.

From Fig. 5 it will be apparent that in order to develop a generator voltage equaling that of a 12-volt battery, the speed of the generator must be increased sufficiently to raise the circulating current and, therefore, the developed voltage thirty-three and one-third per cent. higher than the value shown in the figure. In other words, to obtain 12 volts across brushes 10 and 11, 20 amperes must circulate in the armature and 16 volts must be induced in the winding terminating in brushes 10 and 11. These 16 volts will be opposed by the internal voltage drop of 4 volts, due to the 20 amperes flowing through the windings, so that the effective 12 volts will be obtained across the brushes 10 and 11.

Fig. 6 indicates the conditions existing in the circuits at the instant that the effective voltage across the brushes exactly equals that across the battery, and the automatic switch closes. Both the battery and the shunt field winding 18 are directly connected across the positive brush 10 and the negative brushes 11 and 12. Brushes 11 and 12, being electrically connected by the conductor 16, may be considered as common. As the voltage across the brushes exactly equals and opposes that of the battery, no current will at this time flow through the battery, although with this 12 volts across the brushes, 20 amperes are flowing in the right hand armature winding, 5 amperes of which is furnished to the shunt field while 15 amperes flow in the left hand winding. This condition is graphically represented in Fig. 3, from which it will be noted that at 300 R. P. M. a current of 15 amperes flows through brush 12, a current of 20 amperes through brush 11, while a current of 5 amperes flows from brush 10 which represents the 5 amperes flowing to the shunt field winding 18. At this speed of 300 R. P. M. no current flows to the battery.

After the automatic switch closes and connects the battery across the generator brushes, the battery becomes the controlling voltage factor. Since its voltage is practically constant, the effective voltage at the brushes cannot exceed the 12 volts across the battery terminals, notwithstanding variations of speed of the armature. The current delivered by the generator will, of course, increase with increase in speed and the voltage induced in the armature winding will increase, but this increase of induced voltage will be counteracted by the increased voltage due to the resistance drop, so that the algebraic sum of the voltages effective across the brushes will, at all times, represent the battery voltage. For the purpose of explaining the theory of operation, it is assumed that the battery voltage remains constant at 12 volts, and that the internal resistance of the battery and that of the conductors leading thereto, are negligible. This assumption is reasonable, since the resistance of the battery and its connections, when compared with the internal resistance of the armature windings in this machine, is actually a negligible quantity.

Fig. 9 represents pictorially the conditions diagrammatically represented in Fig. 6. The current values in the respective armature sections are indicated approximately by the relative thickness of the lines, and the current direction in each armature section is indicated by the arrow-heads.

Since, therefore, as above explained, the voltage across brushes 10 and 11 and 10 and 12 cannot with speed increase exceed the 12 volts existing across the battery, it remains to consider what changes are effected in circuit conditions when the speed rises above 300 R. P. M., at which point, as shown in Fig. 6, the battery voltage and the voltage across the brushes is just equal. It is obvious that increase of speed must be accompanied by an increase of voltage induced within the armature winding, but the circulating current flowing through the armature winding in the direction from brush 11 to brush 12 cannot increase, as otherwise the sum of the induced voltage and the drop due to the increased current through these windings, would exceed 12 volts which, as already explained, is an impossibility. Also the voltage existing across brushes 10 and 11 cannot possibly exceed that existing across brushes 10 and 12, since the brushes 11 and 12 are directly connected by a conductor of negligible resistance. The current in the armature winding between brushes 10 and 12 cannot possibly increase, as in this section of the winding, the induced electro-motive force and the electro-motive force due to the voltage drop add together and therefore, if the current in this section should increase, the voltage across brushes 10 and 12 would exceed 12 volts, which is an impossibility. The only possible result, therefore, of an increase of armature speed, is to cause the left hand armature section to supply current to the external circuit. Due to the relative number of field and armature turns which this machine has, the armature conductors exert a magnetizing effect almost four times as great as that imparted by the shunt winding 18. Therefore, a slight reduction in armature current, under the conditions illustrated in Fig. 6, greatly influences the value of the effective flux which produces the electro-motive force. The reduction in voltage, due to the reduced current in the armature when the automatic switch closes, is such that the current in the left hand section between brushes 10 and 12 rapidly drops to zero upon a slight increase in speed. This is illustrated in Fig. 3, which indicates that at approximately 370 R. P. M. the current in the armature between brushes 10 and 12 drops to zero, while current between brushes 10 and 11 drops to twelve and a half amperes. This twelve and a half amperes is divided, 5 amperes flowing to the shunt field and 7½ amperes flowing to the battery. This condition is illustrated diagrammatically in Fig. 7, and the current values are pictorially illustrated in Fig. 10. It will be seen, therefore, that upon an increase of only 70 R. P. M. above the critical speed, the decided reduction in current circulating in the armature windings between brushes 11 and 12 brings about such a decided reduction in the effective flux that the electro-motive force induced in the right hand half of the armature winding actually decreases in value. At a speed of 370 R. P. M. therefore, the effective flux is of such a value that the electro-motive force induced in the left hand armature winding just equals that of the battery and therefore no current flows in this section, while in the right hand section of the armature which is still the source of predominating voltage, 12½ amperes are flowing. The 12 volts across the brushes 10 and 11 is now the resultant of an induced voltage of 14½, less 2½ volts representing the resistance drop. Further increase in speed must, of course, be accompanied by an increase in the voltage induced in the armature windings and above this speed of 370 R. P. M., the left hand armature winding between brushes 10 and 12 will furnish current to the external circuit and perform the function of a generator. This, of course, necessitates that the current through this left hand armature winding and therefore its magneto-motive force, will reverse in direction while the current through the right hand winding will decrease. The magneto-motive force of the left hand armature winding therefore, will be in direct opposition to the magneto-motive force due to the shunt winding 18 of the field, and this, combined with the reduced magneto-motive force due to the falling off of current in the right hand armature winding, will cause a further decided reduction in the effective flux as the speed increases. A representative set of conditions are illustrated in Figs. 8 and 11, in which it is assumed that the speed has increased to 700 R. P. M. At this speed the current in the left hand armature winding between brushes 10 and 12, has reversed in direction and as indicated in Fig. 3, has a value of 12½ amperes, while the current in the right hand winding between brushes 10 and 11 has a value of 5 amperes, or just sufficient to furnish the shunt field excitation, and the total current of 12½ amperes entering the battery is furnished by the left hand armature winding which is now the predominating source of electro-motive force.

At speeds higher than 700 R. P. M., the left hand armature winding furnishes current to the battery in addition to current supplying the shunt field winding and at 1700 R. P. M. the current in the right hand armature winding reduces substantially to zero.

From these curves and diagrams, it is apparent that the output delivered by this machine is wholly under control of the great number of armature turns embracing the full, double pole pitch between brushes 11 and 12 and the current supplied to the external circuit through the positive brush 10 has substantially no effect on the output of the machine.

The arrow in Fig. 2 indicates the direction of rotation of the armature 6 and the pole to the left of the excited pole, which is in a direction against the direction of rotation, may be termed, the "trailing pole," while the pole to the right of the excited pole may be termed the "leading pole." The brush 12, therefore, is said to occupy a trailing position with reference to the trailing pole.

Any pole of the machine may be selected as the generating pole, but it is preferable to employ the one on the bottom of the field yoke, or substantially on the bottom thereof, as by this selection the magnetic attraction tends to lift the armature and counter-acts the effect of its weight on its bearings.

It is obvious that the principles herein described may be employed in other types of machines and that by varying the relative number of turns, current characteristics may be obtained to meet various conditions of service. These and other changes may be made without departing from the invention as set forth in the claims.

Having thus described my invention, what I claim as new and desire to secure by Letters Patent of the United States is:

1. A dynamo-electric machine adapted to operate as a motor or as a generator, said machine having a field structure and a single rotatable ring wound armature, means for utilizing the entire armature and field structure when operating as a motor to obtain a motor of high torque, and means whereby only a portion of said armature is utilized when operating as a generator, whereby a generator of limited capacity is obtained.

2. A dynamo-electric machine adapted to operate as a motor or as a generator, said machine having a field structure and a single rotatable ring wound armature, means for utilizing the entire armature and field structure when operating as a motor to obtain a motor of high torque, and means whereby only a portion of the armature is utilized in generating, whereby a generator of limited capacity is obtained.

3. A dynamo-electric machine adapted to operate as a motor or as a generator, said machine having a field structure and a rotatable armature, means for utilizing the entire armature and field structure when operating as a motor to obtain a motor of high torque, means whereby only a portion of the armature is utilized in generating, whereby a generator of limited capacity is obtained, and means for causing armature reaction to change the distribution of current in said active portion of the armature whereby the active field flux of the generator is limited.

4. A dynamo-electric machine adapted to operate as a motor and as a generator, said machine having a multi-polar field structure, a majority of the field poles being excited by series coils and a small proportion of the field poles being excited by shunt coils, an armature, means whereby the entire field structure and armature are active when the machine is operating as a motor, whereby a relatively high torque is obtained, and means whereby only a portion of the armature within the influence of the shunt excited poles is utilized when the machine operates as a generator, whereby a generator of limited capacity is obtained.

5. A dynamo-electric machine adapted to operate as a motor and as a generator, said machine having a multi-polar field structure, a majority of the field poles being excited by series coils and a small proportion of the field poles being excited by shunt coils, an armature, means whereby the entire field structure and armature are active when the machine is operating as a motor, whereby a relatively high torque is obtained, means whereby only a portion of the armature within the influence of the shunt excited poles is utilized when the machine operates as a generator, whereby a generator of limited capacity is obtained, and means for causing armature reaction to change the distribution of current in said active portion of the armature whereby the effective field flux of the machine is controlled.

6. In a starting and lighting system for automobiles, a multi-polar dynamo-electric machine adapted to operate as a motor or a generator, said machine having a ring-wound armature, a plurality of positive and negative brushes equally spaced with respect to each other and to the poles of said machine, a storage battery, a starting switch for energizing the field and armature from said battery to operate said machine as a motor, said switch also disconnecting a plurality of said brushes whereby the current in said armature is concentrated in a restricted section thereof when the machine operates as a generator.

7. A dynamo-electric machine adapted to operate as a motor and as a generator, said machine having a multi-polar field structure, a majority of the field poles being excited by series coils and a small proportion of the field poles being excited by shunt coils, an armature, means whereby the entire field structure and armature are active when the machine is operating as a motor, whereby a relatively high torque is obtained, means whereby only a portion of the armature within the influence of the shunt excited poles is utilized when the machine operates as a generator, whereby a generator of limited capacity is obtained, and a number of connected brushes spaced to embrace the active portion of the armature, whereby the armature reaction in the active portion of the armature is increased to limit the effective field flux.

8. An automobile starting and lighting system including a dynamo-electric machine having a ring wound armature, a plurality of field poles including a shunt wound pole, brushes corresponding in number to the field poles, connections whereby all of said brushes are active when the machine operates as a motor and connections whereby only a portion of said brushes adjacent the shunt excited pole are active when the machine acts as a generator.

9. In a starting and lighting system for automobiles, a dynamo-electric machine adapted to operate as the starting motor, said machine also operating as a generator under predetermined conditions, a storage battery, a starting switch to connect the battery to the machine to operate the machine as a motor, said switch also disconnecting part of the electrical circuits of said dynamo-electric machine when the machine operates as a generator, said machine being provided with means for causing armature reaction to change the distribution of current in the remaining electrical circuits of said machine to limit the active field flux of said machine.

10. In a starting and lighting system for automobiles, a dynamo-electric machine adapted to operate as the starting motor, said machine also operating as a generator under predetermined conditions, a storage battery, a starting switch to connect the battery to the machine to operate the machine as a motor, said machine when operating as a generator having a field pole provided with a shunt winding, a leading pole and a trailing pole on either side of said energized pole, three brushes equally spaced apart, two of said brushes being arranged on opposite sides of said energized pole, and the third brush being arranged in trailing relation to said trailing pole, said third brush being electrically connected to the more remote of said two first brushes, and means for connecting said brushes to said battery under predetermined conditions.

11. In an electric starter of the class described, a multi-polar dynamo-electric machine provided with an armature and field, means whereby the entire electric and magnetic capacities of said field and armature are utilized when said machine operates as a motor absorbing electric energy, and means whereby a fractional portion of the magnetic and electric capacities of said armature and field are utilized when said machine operates as a generator absorbing mechanical power whereby the current in the armature is concentrated in such fractional portion of said armature.

12. A dynamo-electric machine provided with a field pole, an exciting coil thereon, a leading pole and a trailing pole adjacent to the excited pole and symmetrically arranged on either side thereof, a ring wound armature coöperating with said poles, three brushes uniformly spaced, one located between the leading pole and the excited pole, a second located between the excited pole and the trailing pole, and the third in a trailing position with reference to the trailing pole, and an electrical connection between the first and third brushes.

13. An automobile starting and lighting system including a dynamo-electric machine having a ring wound armature, a plurality of field poles including a shunt wound pole, brushes corresponding in number to the field poles, connections whereby all of said brushes are active when the machine operates as a motor, connections whereby only a portion of said brushes adjacent the shunt excited pole are active when the machine acts as a generator, and means creating a large armature reaction in the portion of the armature embraced between the active brushes in generating, whereby the output of the generator is controlled.

14. In a starting and lighting system for automobiles, a dynamo-electric machine adapted to operate as a starting motor and as a generator, the armature of said machine being ring wound, said machine when operating as a generator having one field pole of one polarity and two poles of opposite polarity and having three brushes, a brush being arranged between the first pole and each of the other poles and the third brush being arranged on the opposite side of one of said second poles, and an electrical connection between said last mentioned brush and the brush on the opposite side of said first pole.

15. In a variable speed generator, an energized field pole, a ring wound armature providing two paths for the flux emanating from said pole and three brushes, a pair of said brushes embracing between them a section of the armature in which the total flux flows and a pair of said brushes embracing between them a section of the armature in which only a portion of said flux flows, one of said brushes being common to each pair, and an electrical connection between the brushes which are not common to said pairs.

16. A dynamo-electric machine having a single armature winding, said machine being adapted to operate as a motor or as a generator, said machine when acting as a motor employing the entire field and armature structures to produce a motor of high torque, and means for confining the generating portion of said armature windings to a relatively small section thereof when the machine acts as a generator.

17. A dynamo-electric machine adapted to operate as a motor or as a generator, said machine when acting as a motor employing the entire field and armature structures to produce a motor of high torque, means for confining the generating portion of the armature to a relatively small portion thereof when the machine acts as a generator, and means for increasing the armature reaction in the entire active portion of the armature, whereby the output of the machine is controlled.

18. A method of operating a dynamo-electric machine capable of operating as a motor or as a generator, which consists in limiting the active portion of the armature in generating to a relatively small portion thereof and causing a relatively large armature reaction in said active portion, whereby the effective field flux of the machine is controlled.

19. A single unit automobile starter and lighter including a dynamo-electric machine having a ring wound armature and a field structure including a plurality of series excited poles and a shunt excited pole, means for utilizing only a relatively small portion of the armature adjacent the shunt excited pole in generating, and connections causing a relatively great armature reaction in said active portion of the armature to assist the flux from said shunt excited pole under certain conditions of operation and to oppose said flux under other conditions of operation, whereby the output of the generator is limited.

20. A dynamo having a ring wound armature, a plurality of series wound poles, a coöperating field pole provided with shunt field winding, a pair of said field poles on opposite sides of said shunt wound pole being adapted to become consequent poles, whereby armature current will affect the distribution of flux through said consequent poles for regulating purposes.

21. A multipolar dynamo-electric machine adapted to operate as a motor and also as a generator, one of its poles being provided with a shunt winding, the two adjacent poles being adapted, under generating conditions, to become consequent poles, whereby armature cross flux will affect the distribution of flux through said consequent poles to maintain a substantially constant generator current throughout wide speed changes.

22. A multipolar dynamo-electric machine adapted to operate as a motor and also as a generator, said machine being provided with an armature and field poles, one of said poles being provided with a shunt field winding, the two adjacent poles being adapted to become magnetized from said first mentioned pole and said armature under generating conditions, whereby opposing E. M. F's are set up in said armature, a pair of brushes coöperating with said armature, said brushes being connected by a conductor to supply one generator lead, said brushes being located to embrace the armature conductors directly influenced by said shunt wound pole and one of said adjacent poles, and a third brush placed between said first named brushes to supply the other generator lead, whereby a substantially constant current is maintained throughout wide speed ranges.

23. A multipolar dynamo-electric machine having a shunt winding on one pole and a series winding on the other poles, whereby the machine will develop a high torque as a motor, said series winding having no practical effect when the machine is operating as a generator, the shunt wound pole being adapted to render the two adjacent poles consequent poles, a ring wound armature associated with said poles whereby said shunt wound pole and one of said consequent poles will set up opposing E. M. F's in the armature coils directly associated therewith, brushes embracing said coils, a conductor connecting said brushes and adapted to supply a generator lead, and a third brush intermediate the first two brushes, adapted to supply the other generator lead.

24. A dynamo-electric machine having a plurality of series wound poles and a shunt wound pole, a pair of said series wound poles being arranged on opposite sides thereof and adapted to be magnetized therefrom, whereby to become consequent poles, and a ring wound armature of which said pair of poles embrace only a relatively small part whereby the field flux will be concentrated in only a small part of said armature.

25. A multipolar dynamo-electric machine adapted to operate as a motor or a generator, said machine having a plurality of series wound poles and a shunt wound pole, a pair of said series wound poles embracing said shunt wound pole and being adapted to be influenced by said shunt wound pole to become consequent poles during generating conditions, an armature associated with said poles adapted to set up a flux to vary the distribution of flux through said consequent poles and also to affect the flux through said shunt wound pole for the purpose specified.

In witness whereof, I have hereunto subscribed my name in the presence of two witnesses.

LEWIS W. NELSON.

Witnesses:
Wm. A. Turbayne,
R. H. Van Nest.